United States Patent [19]

O'Neill

[11] 4,141,675

[45] Feb. 27, 1979

[54] GAS-ACTUATED FUEL PUMP WHEREIN THE PUMP PISTON IS DRIVEN BY A SPRING

[75] Inventor: Cormac G. O'Neill, Laffayette, Calif.

[73] Assignee: Physics International Company, San Leandro, Calif.

[21] Appl. No.: 858,650

[22] Filed: Dec. 8, 1977

Related U.S. Application Data

[63] Continuation-in-part of Ser. No. 642,768, Dec. 22, 1975, Pat. No. 4,098,560.

[51] Int. Cl.[2] .......................... F04B 17/00; F04B 35/00; F16J 1/10

[52] U.S. Cl. .......................... 417/214; 417/380; 417/399; 123/139 AJ; 92/84; 92/13.7

[58] Field of Search ............... 417/214, 380, 398, 399; 123/139 AE, 139 AJ; 92/13.7, 62, 84; 91/170 R

[56] References Cited

U.S. PATENT DOCUMENTS

| | | | |
|---|---|---|---|
| 1,376,277 | 4/1921 | Higgins | 123/139 AJ |
| 1,520,852 | 12/1924 | Cable | 92/62 |
| 1,868,766 | 7/1932 | Reynolds | 92/84 |
| 1,981,667 | 11/1934 | Rockwell | 92/84 |
| 2,064,750 | 12/1936 | Hurst | 417/214 |
| 3,769,879 | 11/1973 | Lofquist | 92/84 |

FOREIGN PATENT DOCUMENTS

| | | | |
|---|---|---|---|
| 1093581 | 5/1955 | France | 123/139 AJ |

*Primary Examiner*—William L. Freeh
*Assistant Examiner*—Thomas I. Ross
*Attorney, Agent, or Firm*—Freilich, Hornbaker, Wasserman, Rosen & Fernandez

[57] ABSTRACT

A fuel pump for providing fuel at relatively high pressure is activated by gas pressure, created during the compression stroke of an internal combustion engine. The pump includes a piston and a hollow plunger which are biased by a single spring in opposite directions. The piston, which is exposed to gases in the engine's cylinder, is urged, by the gas pressure in the cylinder during the compression stroke, to move upwardly. A limit is placed on the piston's upward stroke. When reaching the upward limit the pressure which is applied to fuel in a fuel chamber is only a function of the force applied by the spring to the plunger. When fuel ejection is enabled, the spring pushes the plunger toward the fuel chamber to eject the fuel therefrom. Toward the end of the exhaust stroke the piston moves toward the engine cylinder, forcing the plunger to move in the same direction until the latter's travel is limited by limiting means. Fuel is then injectable into the fuel chamber for subsequent ejection.

10 Claims, 2 Drawing Figures

GAS-ACTUATED FUEL PUMP WHEREIN THE PUMP PISTON IS DRIVEN BY A SPRING

CROSS-REFERENCE TO RELATED APPLICATION

This application is a continuation-in-part application of application Ser. No. 642,768, filed on Dec. 22, 1975, now U.S. Pat. No. 4,098,560.

1. Field of the Invention

The present invention is directed to a pump and more particularly to a relatively inexpensive and simple pump for providing fuel at reasonably high pressure.

2. Description of Prior Art

In modern internal combustion engines fuel is delivered to each of the cylinders at relatively high pressure. One example of a fuel injection system for internal combustion engines is described in U.S. Pat. No. 3,927,652. For proper operation of such a system it is important to be able to control the injected fuel pressure quite accurately. Thus, the pump has to be driven in a reliable manner.

Although pumps can be driven by different means, since in an internal combustion engine high gas pressure is created in each cylinder during the compression stroke, it would be desirable to be able to utilize such gas pressure to drive the pump. However, when so driven, it is important to insure that the engine's compression ratio is not affected to any significant degree by the use of the compressed gases to drive the pump. Also, since engine combustion pressures vary with operating conditions and deterioration is practically unavoidable it is important that the gas-driven pump be designed so that the fuel pressure does not change, due to reductions in the gas pressure due to these factors. Other desired features of such a pump are simplicity, reduced number of components which are subject to wear and, therefore, may require periodic maintenance, a reduced number of precision parts and easy access to such parts for maintenance and/or replacement, without disturbing the other parts of the pump.

OBJECTS AND SUMMARY OF THE INVENTION

It is a primary object of the present invention to provide a new improved fuel pump.

Another object of the present invention is to provide a reliable gas-driven pump for delivering fuel at a controlled pressure.

A further object of the present invention is to provide a fuel pump which is driven by the pressure of gas, created in a cylinder of an internal combustion engine, and wherein the fuel pressure is substantially independent of changes in the cylinder's compression ratio.

Yet a further object is to provide a high pressure fuel pump which is driven by the pressure of gases in an internal combustion engine, the pump being characterized by a minimum number of precision parts which are easily accessible for repair or replacement, without exposure of the interior of the engine.

These and other objects of the invention are achieved by providing a fuel pump with a piston, which is activated by the gas pressure in the cylinder of an internal combustion engine to move in a direction, e.g., upwardly, away from the cylinder. A compressible spring preloads the piston and a moveable plunger, so that as the activated piston moves upwardly the spring urges the plunger upwardly. The plunger pushes a fuel piston toward a fuel chamber to compress the fuel therein. The travel of the activated piston is limited, so that when it reaches the upper limit of travel the pressure on the fuel by the plunger through the fuel piston is only a function of the spring compression. During the exhaust stroke of the cycle of the engine's cylinder the activating piston falls (moves down) toward the engine's cylinder extending the spring, until a separation-limiting abutment prevents further travel of the piston, unless the plunger which is coupled to the piston falls with it. Means are provided to limit the downward motion of the plunger and thereby the downward motion of the activating piston. Fuel pressure in a feed line causes fuel to refill the fuel chamber which provides the displacement force which urges the fuel piston to move downward until it comes in contact with the plunger which has moved down to its downward limit of travel.

The novel features of the invention are set forth with particularity in the appended claims. The invention will best be understood from the following description when read in conjunction with the accompanying drawings.

DESCRIPTION OF PREFERRED EMBODIMENTS

Figure 1:
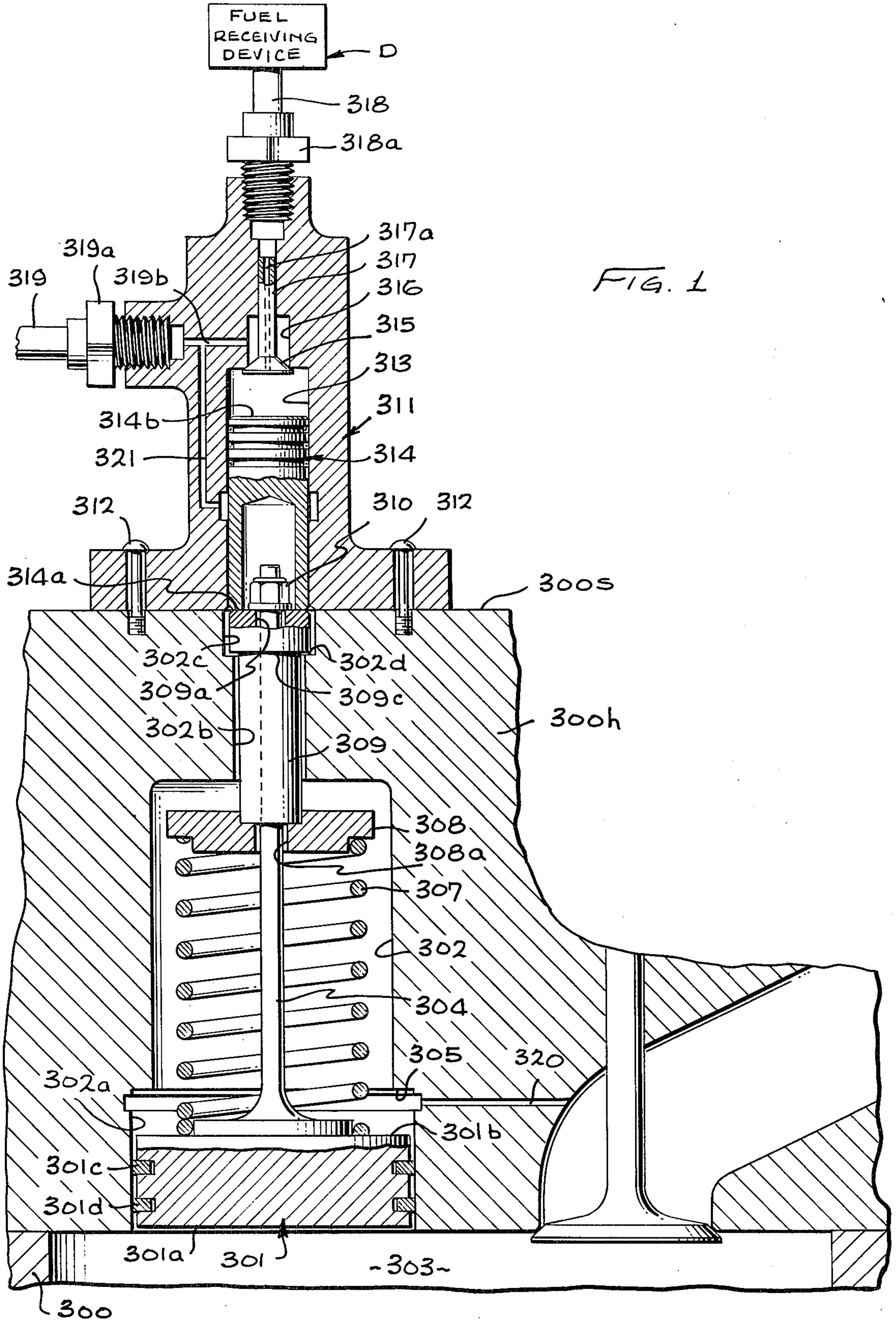
FIG. 1 is a cross-sectional diagram of a preferred embodiment of the invention in one operating position.

Attention is first directed to FIG. 1 wherein a preferred embodiment of the invention, for use with an internal combustion engine, is shown, mostly in cross-sectional view. Therein numeral 303 designates one cylinder of a multi-cylinder engine with engine block 300. The cylinder head is designated by **300*h*. In practice a separate fuel pump is associated with each cylinder engine. However, to simplify the following description only one engine cylinder, cylinder 303, and the fuel pump associated therewith will be described. Formed in the cylinder head 300*h* is a main cylinder 302 which forms part of the fuel pump. Extending from cylinder 302 toward the engine cylinder 303 is a cylinder 302*a* of a diameter greater than that of cylinder 302, while a cylinder 302*b* of reduced diameter extends from cylinder 302 toward the outer surface 300*s* of the cylinder head 300*h*. Cylinder 302*b* has an enlarged portion 302*c* which extends to the cylinder head surface 300*s*. The two cylinders 302 and 302*a*, can be viewed as one cylinder with a counterbored portion (302*a*) near the engine cylinder 303. Likewise, cylinders 302*b* and 302*c* can be viewed as one cylinder with an enlarged counterbored portion (302*c*) so as to form a flange 302*d*** between them for purposes to be explained hereafter.

Located in cylinder **302*a* is a piston 301 which has one side 301*a*, exposed to the engine cylinder 303 and an opposite upper side 301*b*. An extension rod 304 extends from side 301*b* of piston 301 through all the cylinders 302, 302*a*, 302*b*, and 302*c* to the exterior of the cylinder head 300*h*, where the extension rod is threaded to accommodate thereon a nut 310**.

Also included in the fuel pump is a spring 307, a washer 308, and a hollow plunger 309. The washer 308 and plunger 309, although shown as two separate parts, may be formed of one integral unit. The extension rod 304 extends through an opening **308*a* in washer 308 and an opening 309*a* in the hollow plunger 309. The outside diameter (O.D.) of the rod 304 is less than the inside diameter (I.D.) of opening 309***a* so that the plunger can move with respect to rod 304 or piston 301 to which the rod is integrally connected (or forms a part thereof).

The spring is located between the upper side 301*b* of piston 301 and washer 308 to bias the piston 301 and the hollow plunger 309 in opposite directions. As shown, the piston 301 is biased downwardly by the spring 307, while the plunger is biased upwardly. Since the I.D. of opening 309*a* of plunger 309 is less than the outer dimension of nut 310 the spring 307 biases the plunger to urge its upper side 309*b* to be in contact with the nut 310. In the absence of other external forces the nut 310 is adjusted on rod 304 so that the spring 307 is continuously compressed, thus continuously biasing the piston 301 and the plunger 304 in opposite directions. The extension rod 304 and the nut 310 can be viewed as extension means, extending from the piston 301 so that even though the spring 307 biases the plunger 309 and the piston 301 in opposite directions the plunger upper end 309*b* is urged by the spring toward such extension means.

As shown in FIG. 1 the upper portion of the plunger 309 which is accommodated in cylinder 302*c* has a diameter larger than the diameter of the plunger portion in cylinder 302*b*, thereby defining a collar 309*c*. The function of the latter is to limit the downward travel of the plunger 309 when the collar 309*c* abuts against flange 302*d*.

As further shown in FIG. 1, the difference in the diameters of cylinders 302 and 302*a* results in the formation of a flange 305, whose function is to limit the upward travel of the piston 301, which occurs when its upper side 301*b* abust against flange 305.

The parts as described so far do not require close machining tolerances. All the cylinders 302, 302*a*–302*c* are easily machinable in the cylinder head 300*h*. As to the piston 301 it has to be machined to provide reasonable clearance in cylinder 302*a* and to be of a diameter, larger than that of cylinder 302, to assure that when the piston 301 is urged upwardly by the pressure of gases in cylinder 303 its upper side 301*b* will abut against flange 305. Likewise, plunger 309 need be machined only with limited precision to insure that it can move freely in cylinders 302*b* and 302*c* and with respect to rod 304. Collar 309*c* of plunger 309 need be larger than the diameter of cylinder 302*b* to insure the abutment of the plunger's collar with flange 302*d*. As shown, rings 301*c* and 301*d* surround piston 301. As is appreciated, their function is to minimize the leakage of gases from engine cylinder 303 into the upper cylinders.

The parts of the pump described so far are easily assembled in the cylinder head 300*h*, and once assembled require little maintenance, if any. Any adjustment of the force applied by spring 307 may be achieved by turning nut 310 which is exposed through surface 300*s* of cylinder head 300*h*. It should be stressed that even though the nut 310 and the plunger 309 are exposed through surface 300*s* the interior of the engine cylinder 303 is not exposed, since plunger 309 rests on flange 302*d*, and rings 301*c* and 301*d* effectively seal off the engine cylinder 303 from the environment above it. Thus, the engine cylinder 303 is protected from dirt or moisture.

The only parts of the novel pump of the present invention which have to be machined to close tolerances are included in or formed in housing structure 311, which by means of bolts 312 is attachable to the surface 300*s* of cylinder head 300*h*. A finely-machined cylinder 313 is formed in structure 311, and when the latter is attached to cylinder head 300*h* cylinders 313 and 302*c* are concentrically aligned. A close-fitting piston 314 is provided and is located in cylinder 313. The lower end 314*a* of piston 314 abuts against the upper end of plunger 309, while the upper end 314*b* of the piston forms one side of the fuel chamber which is represented by the upper part of the cylinder 313. Hereafter, for explanatory purposes, the fuel chamber will also be designated by 313 since it is the upper part of cylinder 313. The lower end 314*a* of the piston 314 is counterbored to provide clearance for the nut 310.

In the embodiment shown in FIG. 1, a check valve 315 is mounted in the upper end of cylinder 313 and it effectively separates the fuel chamber 313 from a fuel inlet cylinder-like compartment 316. Fuel at low pressure is received by the pump via an inlet line 319 which is connected by a coupler 319*a* to a fuel inlet path 319*b*, which extends to compartment 316. Fuel under high pressure is ejected out of the fuel chamber 313 through an axial opening 317*a* in the valve stem 317, which is coupled to an outlet line 318 by a coupler 318*a*. D represents a device adapted to receive the fuel from line 318.

The pump, as shown in FIG. 1, is in the position before the gas pressure in the engine cylinder 303 has reached a level sufficient to urge piston 301 upwardly. In this position the plunger 309 is in its most downward position in which it rests on flange 302*d*, and the piston 314 is also in its most downward position, with the fuel chamber 313 being assumed to be full with fuel at low pressure, e.g., 15–100psi(1–7 bars). As the gas pressure in the engine cylinder 303 rises due to the compression of gases by the rising engine piston in cylinder 303, an upward force is applied by the gases on side 301*a* of piston 301 urging it to move in an upward direction. As piston 301 rises it compresses spring 307, which therefore biases plunger 309 with a greater force upwardly. The plunger 309 therefore urges piston 314 upwardly. If the fuel in chamber 313 were free to exit through outlet 318 the plunger 309 and piston 314 would rise together with the rising piston 301 and therefore eject the fuel from the fuel chamber 313. However, in practice once the fuel is in chamber 313 it can't exit outlet line 318 until the device D is enabled or a command signal is supplied to enable fuel to flow to it from chamber 313. Thus, as piston 301 rises the plunger 309 and piston 314 only rise to the extent that the fuel in chamber 313 can be compressed.

As is appreciated, fuel has a relatively low bulk compressibility. Thus displacement of piston 314 equivalent to the displacement of piston 301 is not possible. Therefore as piston 301 rises when the fuel in chamber 313 can no longer be compressed, i.e., piston 314 can rise no farther it stops the upward motion of plunger 309. Consequently, spring 307 is compressed to a greater degree. In fact, it accommodates the difference in displacements between pistons 301 and 314. The area ratio between these pistons is chosen so that the full upward travel of piston 301 (when its upper side 301*b* abuts flange 305) occurs at approximately one half the compression stroke of the engine cylinder 303 and considerably in advance of normal combustion.

Figure 2:
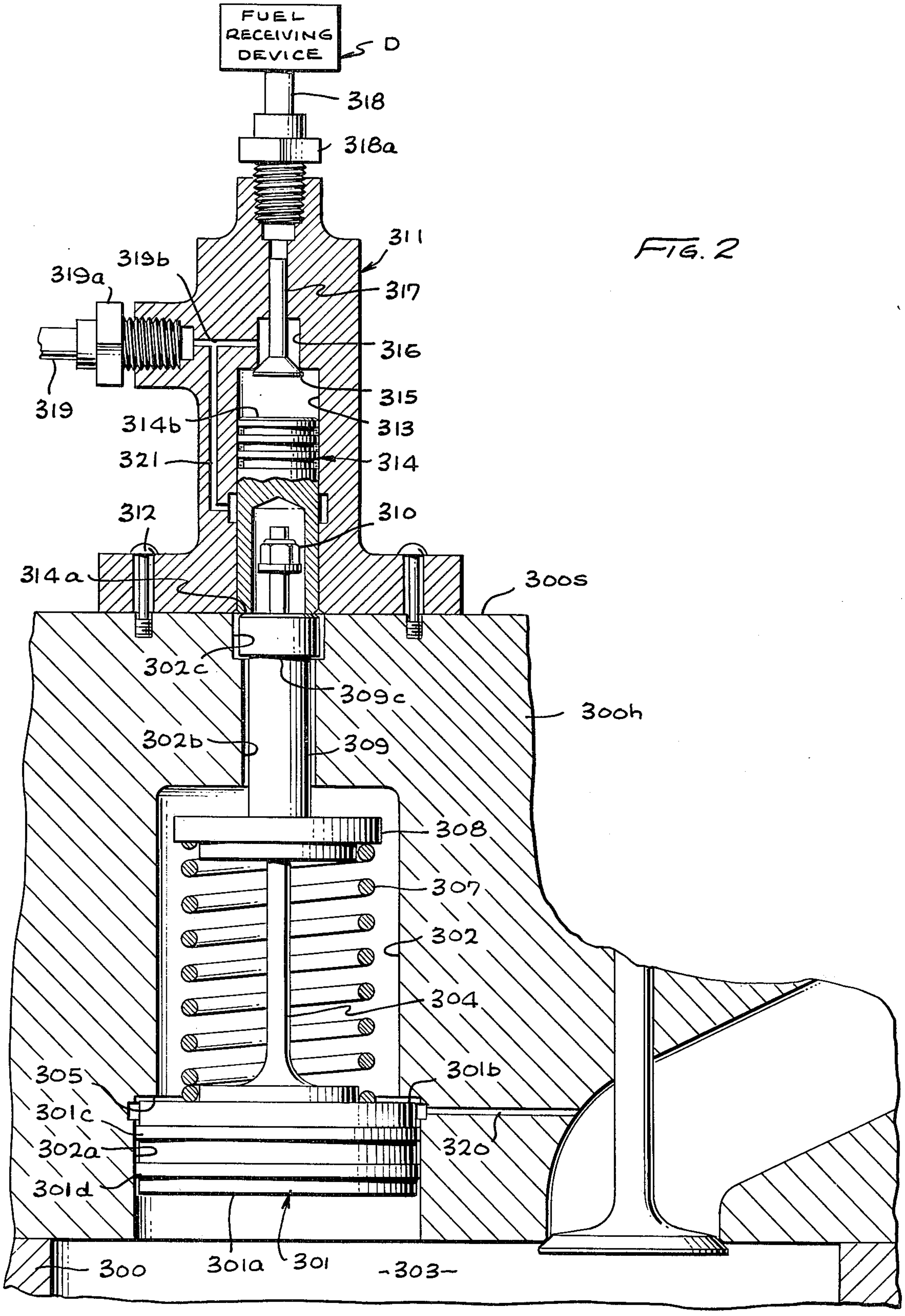
FIG. 2 is a cross-sectional diagram of the same embodiment in a different operating position.

With the piston 301 in its most upward position (as shown in FIG. 2) the pressure applied to the fuel is that due to the energy in the compressed spring, rather than due to the gas pressure in the engine cylinder 303. Thus the spring 307 provides an accumulator effect in that a volume of fuel under pressure determined by the spring, rather than the engine condition, is available for injection into device D, e.g., an injector, or to perform servo functions under the control of a mechanical or electrical valve.

When ejection of the fuel for the pump is enabled, while the piston 301 is still in its most upward position spring 307 pushes the plunger upwardly which in turn pushes up the piston 314. The latter pushes on the fuel, forcing it to exit the fuel chamber 313 through the opening 317*a* in stem 317 and therefrom into the fuel outlet line 318.

When the fuel ejection process is completed and the engine rotates to the end of the exhaust stroke, piston 301 falls down, i.e., toward cylinder 303 due to the bias applied to it by spring 307. As piston 301 moves down, nut 310 also moves down urging the plunger 309 to move down even though the spring 307 biases it in the opposite direction. Plunger 309 moves down until its collar 309*c* abuts flange 302*d*. When fuel is delivered to the pump via line 319 the fuel pressure, though low, opens valve 315 so that fuel flows from compartment 316 to fuel chamber 313. It provides the displacing force for piston 314 to move down until it abuts against the upper side of plunger 309.

As shown in FIGS. 1 and 2, a channel 320 is provided to vent any gases that leaked past piston rings 301*c* and 301*d* to the engine's inlet port. A relief groove 321 is provided between cylinder 313 and inlet passage 319*b*, to return any fuel that leaked down the clearance between cylinders 313 and piston 314 to the inlet passage.

It is recognized that when the piston 301 moves up it alters the clearance volume of the engine cylinder 303. However, since the upward stroke of piston 301 is limited by the flange 305 it has minimal effect on the compression ratio, which may be compensated for by the initial engine design. Also, the piston 301 reaches its upward limit before combustion occurs. Therefore, during combustion it is stationary. Consequently, wear, thermal loading, and lubrication problems are greatly minimized.

From the foregoing it should thus be appreciated that the pump of the present invention is capable of providing fuel at high pressure, e.g., 5000 psi, without any rugged gearing or other complex devices. Although the pump is driven by gas pressure, such as that created in an engine cylinder, the pressure provided by the pump is dependent on spring 307 and not the pressure in the engine cylinder 303, which may vary with operating conditions and engine wear. The pump includes only a few parts which require high machining tolerance, thereby reducing pump cost. The portions of the pump in the cylinder head 300*h* may be assembled by the engine manufacturer with conventional fit, finishes and processes. The structure 311 which requires a cylinder 313 and piston 314 with close tolerances may be supplied by a component manufacturer and attached to the head 300*h* at a later date. Also, it can be removed very easily by retaining bolts 312 for maintenance, repair or replacement, without disturbing the rest of the pump parts. The spring compressibility is easily adjustable by nut 310. The pump is of modular construction, so that if one pump or cylinder fails it does not affect the others.

Although the pump embodiment, heretofore described, is a preferred one, the invention is not limited thereto. Many of the advantages of the pump of the present invention are realizable in an embodiment in which structure 311 is made an integral part of the cylinder head 300*h*. In such an embodiment plunger 309 and piston 314 may be machined as one single element, rather than two separate parts. Also, although the novel pump has been described in connection with an internal combustion engine where the gas pressure in one of its cylinders is used to drive the pump, the latter may be driven by gas pressure from any other source.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A fuel pump comprising:

first wall means defining a fuel chamber;

inlet means in communication with said fuel chamber for supplying fuel thereto at a selected first pressure, outlet means in communication with said fuel chamber and with a fuel-receiving device for facilitating the supply of fuel from said fuel chamber to said device when the latter is in condition to receive fuel; and control means for increasing the pressure of the fuel in said fuel chamber and for ejecting the fuel therefrom for supply to said device when the latter is in condition to receive fuel, said control means including a first piston having a first end defining one side of said fuel chamber, said first piston being moveable in a first direction whereby the volume of said fuel chamber increases, and in a second direction, opposite said first direction, whereby the fuel chamber volume decreases, and a second piston exposable to a source of gas, said second piston being moveable in said second direction away from said source, movement of said second piston in said second direction being limited to a predetermined maximum distance by a stop means, in response to pressure of the gas from said source, said control means further include spring means for biasing said first and second pistons in said second and first directions, respectively, whereby when said second piston moves in said second direction in response to gas pressure said spring means biases said first piston in said second direction with increased force, to increase the pressure of the fuel in said fuel chamber, so that when said second piston reaches said maximal distance the bias force applied to said first piston in said second direction is a function of only said spring means, said first piston being moveable in said second direction by the bias applied thereto by said spring means to eject fuel from said fuel chamber when said device is in a condition to receive fuel, with said second piston being moveable in said first direction toward said source when the gas pressure therein is below a selected level.

2. A fuel pump as described in claim 1 wherein said control means includes means for adjusting the bias said spring means applies to said first and second pistons.

3. A fuel pump as described in claim 1 wherein said control means include means for limiting the movement of said first piston in said first direction.

4. A fuel pump as described in claim 1 wherein said source of gas is an engine cylinder of an internal combustion engine, wherein the pressure of gas to which said second piston is exposed increases to drive said piston in said second direction during the compression stroke of said engine cylinder and said second piston moves in said first direction during the exhaust stroke of said engine cylinder.

5. A fuel pump as described in claim 4 wherein said engine includes a cylinder head defining a first cylinder, having a counterbored portion of enlarged diameter facing said engine cylinder with said second piston located in said counterbored portion and adapted to move said maximum distance in said second direction up to the upper end of said counterbored portion.

6. A fuel pump as described in claim 4 wherein said first wall means are part of a structure adapted to be attached to the exterior of a cylinder head of said engine, said first wall means defining a cylinder in said structure, with said first piston located therein, the fuel chamber being the portion of the cylinder defined by said first wall means above the first end of said first piston.

7. A fuel pump as described in claim 6 wherein said control means includes means for adjusting the bias said spring means applies to said first and second pistons.

8. A fuel pump as described in claim 7 wherein said control means include means for limiting the movement of said first piston in said first direction.

9. A fuel pump as described in claim 8 wherein said engine includes a cylinder head defining a first cylinder, having a counterbored portion of enlarged diameter facing said engine cylinder with said second piston located in said counterbored portion and adapted to move said maximum distance in said second direction up to the upper end of said counterbored portion.

10. A fuel pump as described in claim 9 wherein said control means include an extension rod having a first end extending from the side of the second piston which is adapted to come in contact with the upper side of said counterbored portion and a second threaded opposite end and a nut threadable in said rod, a hollow plunger having an elongated opening through which said rod extends, said plunger being adapted to move relative to said rod, said spring means comprising a single spring for biasing said second piston and said plunger in said first and second directions respectively, the dimension of the opening in said plunger being smaller than the nut dimension, whereby the motion of said plunger in said second direction is limited by said nut, said cylinder head defining a flange and said plunger having an enlarged collar extending to its upper end whereby the movement of said plunger in said first direction is limited when said collar abuts said flange, said first piston having a second end opposite its first end, which abuts the upper end of said plunger, said second end of said first piston being counterbored to provide an opening in which said nut is accommodated to freely move therein.

* * * * *